United States Patent [19]
Chen et al.

[11] Patent Number: 6,025,020
[45] Date of Patent: *Feb. 15, 2000

[54] PREPARATION OF HIGH ENERGY CAPACITY RUTHENIUM OXIDE

[76] Inventors: Zheng Chen; Millard Franklin Rose, both of Space Power Institute, Auburn Universitiy, Auburn University, Ala. 36849-5320

[ * ] Notice: This patent issued on a continued prosecution application filed under 37 CFR 1.53(d), and is subject to the twenty year patent term provisions of 35 U.S.C. 154(a)(2).

[21] Appl. No.: 08/947,267

[22] Filed: Oct. 8, 1997

[51] Int. Cl.[7] ........................................ B05D 3/02
[52] U.S. Cl. .................. 427/226; 427/79; 427/126.3; 427/113
[58] Field of Search ..................... 361/314, 315, 361/321.1, 321.5, 303, 324; 427/79, 226, 126.3, 113

[56] References Cited

U.S. PATENT DOCUMENTS

| | | | |
|---|---|---|---|
| 5,079,674 | 1/1992 | Malaspina | 361/502 |
| 5,080,963 | 1/1992 | Tatarchuk et al. | 428/225 |
| 5,096,663 | 3/1992 | Tatarchuk | 419/11 |
| 5,102,745 | 4/1992 | Tatarchuk et al. | 428/605 |
| 5,538,813 | 7/1996 | Li | 429/192 |
| 5,550,706 | 8/1996 | Kurzweil et al. | 361/502 |
| 5,600,536 | 2/1997 | Jow et al. | 361/503 |

OTHER PUBLICATIONS

P. Kurzweil and O. Schmid, "High Performance Metal Oxide Supercapacitors," Proc. 6th Int'l Seminar on Double Layer Capacitors and Similar Energy Storage Devices, Deerfield Beach, FLA, 1996 No page and month data are available.

*Primary Examiner*—Roy V. King
*Attorney, Agent, or Firm*—Eugene I. Snyder

[57] ABSTRACT

Amorphous, highly dispersed ruthenium oxide having a high energy storage capacity may be prepared using high surface area carbon as carbon powder or as carbon fibers as a template for the ruthenium oxide. The process avoids the disadvantages of a sol-gel process, and utilizes deposition of a ruthenium source within the pores of carbon fibers dispersed in a cellulose matrix. The ruthenium source subsequently is converted to amorphous ruthenium oxide hydrate by heating in a steam atmosphere containing at least 30 weight percent water at temperatures up to about 500° C.

9 Claims, No Drawings

PREPARATION OF HIGH ENERGY CAPACITY RUTHENIUM OXIDE

FIELD OF THE INVENTION

This invention relates to the preparation of ruthenium oxide and its hydrates suitable for use as a high energy storage capacity electrode material. More particularly, the invention herein relates to a process for the preparation of well dispersed ruthenium oxide presenting a very high surface area of amorphous ruthenium oxide.

BACKGROUND OF THE INVENTION

In recent years ruthenium oxide and its hydrate has been found to be excellent materials for high energy density electrodes because of their high capacitance and low resistance. See, for example, P. Kurzweil and O. Schmid, "High Performance Metal Oxide Supercapacitors," Proc. 6th International Seminar on Double Layer Capacitors and Similar Energy Storage Devices, Deerfield Beach, Fla. (1966). The outstanding capacitance properties of ruthenium oxide are postulated to arise in part from multiple oxidation states of ruthenium and the facile conversion of ruthenium from one oxidation state to another, and in part to proton mobility between the oxide and hydroxyl sites in hydrated ruthenium oxide. However, the observed capacitance of ruthenium oxide is quite dependent on its physical state. In particular, it has been recognized that high capacitance requires that ruthenium oxide be in the amorphous state with a high degree of hydration.

Energy storage in hydrated ruthenium oxide is associated with protons reacting with oxide species at the surface, consequently the surface area of the oxide determines its storage capability. It is clear that high surface area material is required for high energy storage density. Energy storage also is associated with the amorphous phase of the oxide, hence it also follows that a high energy density is favored by low crystallinity of ruthenium oxide. Jow et al. in U.S. Pat. No. 5,600,535 recognized that thin films of amorphous ruthenium oxide were highly desirable for electrode materials, and also recognized that electrodes require good adhesion of such films in order to provide a stable electrode. His solution to the problem of preparing the aforementioned materials was to prepare amorphous film electrodes by a sol-gel process where the ruthenium oxide precursor was coated on a substrate and subsequently annealed at temperatures which minimized the formation of any crystalline phase of ruthenium oxide. The patentees utilized as a substrate and current collector metals, especially titanium, although they mention that carbon powder also can be coated by their method. A specific capacitance as high as 430 farads/g was obtained by their process.

Jow formed his films wherein a sol-gel process was used to form a ruthenium alkoxide in non-aqueous solvents. A thin film of ruthenium alkoxide was deposited on titanium metal by, for example, dip coating, and the film thereafter was carefully annealed at 100–450° C., a temperature range which minimized crystalline phase formation. The process was repeated to form a film of desired extent and thickness. However, the process was subject to several critical constraints. The patentees noted that a pH of 3–6 for $RuCl_3 \cdot xH_2O$ solution used as the ruthenium source was necessary for acceptable performance. The patentees also noted that the success of their method was quite dependent on the amount of alkali metal alkoxide used to form the ruthenium alkoxide; too much causes precipitation of ruthenium species and too little leads to poor adhesion of the subsequently formed film. Additionally, post treatment of coated metal is imperative to remove alkali metal from the film. The patentees also noted that the specific capacitance of the final material was quite dependent on the alkoxide used, even among such related alkoxides as ruthenium methoxide, ruthenium ethoxide, and ruthenium isopropoxide. Overall the process is time consuming with much opportunity of wasting expensive ruthenium oxide powder during repeated washing and drying required during processing.

To prepare a high energy storage density ruthenium oxide electrode it was imperative to develop an alternative to Jow's method. The process ought to be simple, with few if any critical variables. The process also ought to be efficient in ruthenium utilization, with few opportunities for ruthenium loss. The process in addition ought to be reliable, giving high performance material under a reasonable range of conditions. We have developed such a process as described and claimed below. Briefly, our process impregnates high surface area carbon fibers immobilized and dispersed in a cellulose matrix with an aqueous solution of a ruthenium source and subsequently converts the ruthenium deposited in the carbon fiber pores to highly disordered amorphous ruthenium oxide by heating the treated fiber in a controlled water atmosphere. Our process is simple and easy to carry out even by relatively unskilled operators, with virtually 100% utilization of ruthenium. The resulting ruthenium oxide-carbon fiber dispersed in a cellulose matrix shows an energy storage density, on a ruthenium oxide basis, close to 130 Joules/g, which is roughly equivalent to a specific capacitance of about 1040 farads/g ruthenium oxide.

SUMMARY OF THE INVENTION

The purpose of our invention is to prepare ruthenium oxide hydrates capable of high charge storage capacity. An embodiment comprises impregnating a high surface area carbon fiber which has been dispersed in a cellulose matrix with an aqueous solution of a ruthenium source, and subsequently converting the ruthenium source to a highly amorphous ruthenium oxide by heating in a steam atmosphere. In a more specific embodiment the cellulose matrix contains from about 82 to about 88 weight percent of high surface area carbon fibers. In a still more specific embodiment conversion of the ruthenium source is effected by heating at a temperature from about ambient to about 500° C. in a steam atmosphere containing from about 50 up to about 70 weight percent water. Other embodiments will be clear from our ensuing description.

DESCRIPTION OF THE INVENTION

The present method of preparing ruthenium oxide hydrate material with high energy storage capacity capabilities has many limitations which diminish the usefulness of ruthenium oxide as high capacity electrode materials. The prior art process has several critical variables which significantly affects performance and is inherently inefficient in ruthenium usage. In contrast, the process which is our invention is simple to use, affords high energy storage capacity hydrated ruthenium oxide under diverse conditions, and leads to little ruthenium loss. In short, our process presents numerous distinct advantages over the prior art.

Our process has several key characteristics. A high surface area ruthenium oxide arises from the use of a carbon fiber template where the carbon fiber itself has a high surface area. Additionally, a highly amorphous, disordered ruthenium oxide is produced by steaming a ruthenium source deposited within the pores of high surface area carbon fibers at elevated temperatures with conversion of the ruthenium source to a ruthenium oxide hydrate. Each of the foregoing characteristics is critical, yet the process details which lead to such characteristics are themselves not critical.

The dispersion of high surface area carbon fibers in a cellulose matrix—referred to herein as a preform—used as the starting point in preparing the materials of our invention can be made by a relatively straightforward, uncomplicated method analogous to that described in U.S. Pat. No. 5,080, 963, 5,096,663, and 5,102,745. The carbon fibers are dispersed in a fluid medium along with cellulose acting as a binder and matrix for the carbon fibers. The resulting dispersion is then cast into a predetermined shape and heated to dry the cast dispersion prior to impregnating the carbon fiber with a ruthenium source. By "high surface area carbon fibers" are meant carbon fibers with a surface area of at least 200 $m^2/g$, preferably at least 500 $m^2/g$, and even more desirably at least about 750 $m^2/g$. Carbon fibers with a surface area of over 1000 $m^2/g$ have been used quite successfully. The diameters of the carbon fibers are generally in the range of 5–30 microns, principally because of their availability. Ideally, carbon fibers in the 0.5–50 micron range would be most desirable ones. But it needs to be emphasized again that the method of preparation and successful production of the materials of our invention are not limited by fiber diameters, at least up to about 50 microns.

The high surface area fibers are dispersed in a fluid medium. It is not essential to have an absolutely uniform dispersion, although often such uniformity is desirable. Dispersion may be effected by such means as sonication, agitation, ball milling, and so forth. The purpose of the liquid is merely to facilitate effective dispersion of the solids, especially where one wants as uniform a dispersion as is feasible in the final preform. Since the liquid is later removed it is clear that it should be readily removable, as by volatilization. Water is normally a quite suitable liquid, although water-alcohol mixtures, and especially water-glycol mixtures, may be used. Illustrative examples of other liquids include methanol, ethanol, propanol, ethylene glycol, propylene glycol, butylene glycol, poly(ethylene glycol)(s), poly(propylene glycol)(s), and so forth. Other organic liquids also may be used, but normally without any advantages. Since water is by far the most economical and most universally available liquid it is the one of choice in the practice of our invention. While some mixtures of the above noted liquids may be used to adjust the viscosity of the dispersion so that filtering or settling onto a screen or filter provides a certain degree of uniformity within the "wet" preform regardless of the densities and drag forces acting on the various particulates, still other additives including surfactants and dispersing agents can be used to assist in the mixing process. We emphasize again that the liquid functions only as a medium facilitating the dispersion of materials in preparing the preforms.

A preform is the solid containing a nonwoven dispersion of the high surface area fibers in a cellulose matrix. The purpose of the cellulose is to permit the fabrication of a solid preform of an otherwise structurally unstable dispersion of the carbon fibers where the preform can be shaped, stored, and otherwise handled prior to subsequent processing. The cellulose merely provides a stable, although relatively weak, physical structure which maintains the spatial relationship of the dispersed carbon fibers. Cellulose, in all its forms and modifications, is the most desirable matrix material because it may be volatilized completely at relatively low temperatures with little ash formation, is unreactive toward other components in the preform, and is readily available. In particular, the cellulosic materials typically used in the paper-making process are especially favored; the skilled worker will readily recognize the elements of the paper-making process in the foregoing description. The carbon fiber content of the dry preform may be as low as about 50 weight percent and as high as about 90 weight percent, although typically it will range from about 82 to about 88 weight percent.

After the dispersion of high surface area carbon fibers and cellulose in a liquid is attained, the solids are collected, as on a mat. Excess liquid may be removed, such as by pressing, and the resulting solid dispersion usually is dried (i.e., liquid is removed), especially where it is to be stored prior to further treatment. In the usual case there is nothing particularly critical in the drying process, and drying may be performed in air, under elevated temperatures, or in a flowing gas. The mass also may be compacted under pressure to a greater or lesser extent. The dispersion may be cast into a predetermined shape prior to, coincident with, or after drying, with the last named procedure the one most commonly employed. The preform resulting from drying is generally quite flexible and adaptable to shapes of various sorts. Often it is quite convenient to cast the dispersion into sheets which can then be rolled up and stored prior to subsequent treatment.

The next stage in the preparation of high energy storage capacity ruthenium oxide material is the impregnation of the carbon fibers in the preform with a solution, and preferably an aqueous solution, of a ruthenium source. The nature of the ruthenium source is unimportant, the prime requisite (for convenience) being that the source be water soluble. Simple ruthenium salts may be readily used in the practice of our invention and among these may be mentioned the ruthenium halides, especially ruthenium chloride, as well as other water-soluble ruthenium compounds, e.g., ammoniated ruthenium oxy chloride. It also is convenient that the ruthenium in the ruthenium source be Ru(III). However, this is only a matter of convenience, since in the conversion of the ruthenium source to the oxide conversion of lower oxidation states to Ru(IV) will occur concomitantly. Impregnation of the carbon fibers may be done merely by contacting the fiber dispersed in the cellulose matrix with a solution of the ruthenium compound. By such contact, as arises by dip coating, for example, the ruthenium compound is absorbed into the pores of the high surface area carbon fibers. When an adequate amount of ruthenium has been so absorbed, the wet matrix is dried leading to deposition of a solid ruthenium source into the carbon pores.

The ruthenium compound as deposited in the carbon pores is then converted to highly amorphous ruthenium oxide. Note that because the ruthenium initially was deposited within the pores of a high surface area carbon fiber, its conversion to the oxide necessarily will lead to highly dispersed ruthenium oxide. Conversion to highly amorphous ruthenium oxide is achieved by heating the ruthenium-impregnated carbon fibers in the preform in a steam/oxygen atmosphere, where the oxygen generally is supplied as air. Heating may be done at temperatures up to about 500° C., with a preferred range of temperatures from about 420 up to about 475° C. Heating must be done in a steam atmosphere, which is to say that heating is done in a water vapor atmosphere. The minimum amount of water vapor in the flowing air stream is preferably at least 30 weight percent water with the maximum water vapor tolerable at least about 80 weight percent. Most usually the water vapor content in the steam atmosphere is between about 50 and about 70 weight percent. Heating times between about 15 and about 45 minutes typically will suffice to convert the ruthenium source to a highly amorphous ruthenium oxide hydrate well dispersed on a high surface area carbon fiber. In the aforedescribed treatment the air provides oxygen, needed for ruthenium oxidation and ruthenium oxide formation, and the steam plays a role to disorder the ruthenium oxide structure to form amorphous, rather than crystalline, ruthenium hydrated oxide. Although acceptable products result from a rather wide range of ruthenium oxide content, we prefer a composite containing from about 20 up to about 40 weight percent ruthenium oxide, $RuO_2$ based on total composite.

In an optional variation the ruthenium oxide hydrate initially formed, which may be written as $RuO_2.xH_2O$, may be heated to drive off "excess" water in order to obtain the desired degree of hydration of the ruthenium oxide. Heating typically can be done at temperatures between about 100 and 150° C., depending upon how much water one desires to remove from the initially formed ruthenium oxide hydrate.

Although the foregoing description has emphasized amorphous ruhenium oxide hydrate on carbon fibers, two alternative embodiments are encompassed by our invention. One important alternative is the embodiment where carbon powder is used as a substitute for the carbon fibers. The purpose of coating ruthenium on the powder is to maximize the surface area of the resulting ruthenium oxide, which can result in having more ruthenium ions reacting with the surrounding protons. As a consequence, the coating on the powder can improve the capacitor performance in areas such as specific power density, energy density, and capacitance response to fast charging and discharging.

In a second alternative the ruthenium oxide coating can be heat-treated at a temperature above about 350° C. in air for about 5 hours to convert amorphous $RuO_2$ to crystalline $RuO_2$ for those applications which need $RuO_2$ in crystal form, or for those occasions when the capacitor needs to be operated or assembled at a temperature above about 175° C. It is recognized that conversion to the crystalline form comes at a cost of reduced energy storage, consequently use of the amorphous $RuO_2$ generally is favored. It is equally important to recognize that where extraneous factors require crystalline $RuO_2$ our invention remains viable; its effectiveness is diminished but not extinguished.

EXAMPLE

Preparation of Amorphous Ruthenium Oxide Hydrate on Carbon Fiber. Carbon fibers of surface area 2000 square meters per gram were mixed with about 18 weight percent cellulose in water, dispersed by a slow speed blender, and then cast into discs of 1.25 inch diameter. Discs were dried at 120° C. for 2 hours to remove water. The discs were then impregnated with ruthenium by contacting the preform with a 20–40 weight percent aqueous solution of ruthenium chloride. Typically, about 2 grams of, e.g., ruthenium chloride solution per gram of cellulose-carbon fiber dispersion was utilized, with a total contact time of about 5 minutes. Excess solution was removed by leaving the impregnated preform in a vacuum oven at 20 mm Hg and ambient temperature (ca. 25° C.) for 10 minutes and the preform then was dried at 100° C. for 5 hours.

The dried preform impregnated with ruthenium was heated at 475° C. in a steam atmosphere containing about 60 weight percent water vapor for 45 minutes to convert the ruthenium deposited within the carbon fiber pores to amorphous ruthenium oxide hydrate. Subsequently the hydrate can be heated at a temperature in the interval 100–150° C. to achieve the desired degree of hydration. The amorphous ruthenium oxide coated carbon fibers may be soaked in sulfuric acid, e.g., 5 molar acid for 24 hours, prior to use in capacitor applications.

What is claimed is:

1. A process for the preparation of an amorphous ruthenium oxide composite comprising:

a. impregnating high surface area carbon fibers dispersed in a cellulose matrix with an aqueous solution of a ruthenium source;

b. drying the matrix of ruthenium source impregnated carbon fibers at a temperature sufficient to remove water;

c. heating the dried matrix of impregnated carbon fibers in a steam and oxygen atmosphere containing at least 30 weight percent water at a temperature up to about 500° C. for a time sufficient to convert the ruthenium source to amorphous ruthenium oxide hydrate; and d. recovering as said composite the amorphous ruthenium oxide hydrate impregnated on high surface area carbon fibers dispersed in a cellulose matrix.

2. The process of claim 1 where the cellulose matrix contains from about 50 to about 90 weight percent high surface area carbon fibers.

3. The process of claim 1 where the carbon fibers have a surface area of at least about 200 square meters per gram.

4. The process of claim 1 where the ruthenium source is a ruthenium halide.

5. The process of claim 1 where the steam atmosphere contains from about 30 up to about 80 weight percent water.

6. The process of claim 1 where the dried matrix of the ruthenium-impregnated carbon fibers is heated at a temperature between about 420 up to about 475° C.

7. The process of claim 1 further characterized in that the amorphous ruthenium oxide hydrate impregnated on high surface area carbon fibers dispersed in a cellulose matrix is subsequently heated in a dried atmosphere at a temperature between about 100 to about 150° C. for a time effective to produce $RuO_2.xH_2O$ with the desired degree of hydration.

8. The process of claim 1 where said composite contains from about 20 up to about 40 weight percent ruthenium oxide based on total composite.

9. The process of claim 1 further characterized in that the amorphous ruthenium oxide composite is subsequently heated in air at a temperature above about 350° C. for a time effective to convert the amorphous ruthenium oxide in said composite to a crystalline state.

* * * * *